BEST AVAILABLE COPY

S. B. SEXTON.

Fireplace Stove.

No. 2,476.

Reissued Feb. 12, 1867.

Witnesses

Inventor

S. B. Sexton

N. PETERS, Photo-Lithographer, Washington, D. C.

UNITED STATES PATENT OFFICE.

SAMUEL B. SEXTON, OF BALTIMORE, MARYLAND.

HEATING-STOVE.

Specification forming part of Letters Patent No. 23,716, dated April 19, 1859; Reissue No. 1,242, dated December 3, 1861; Reissue No. 1,642, dated February 6, 1864; Reissue No. 1,774, dated September 27, 1864; Reissue No. 2,476, dated February 12, 1867.

*To all whom it may concern:*

Be it known that I, SAMUEL B. SEXTON, of Baltimore, State of Maryland, have invented certain new and useful Improvements in Base-Burning Stoves for Heating and Warming Purposes; and I do hereby declare that the following is a full, clear, and exact description of the same, reference being had to the accompanying drawings, forming part of this specification, in which—

Figure 3:
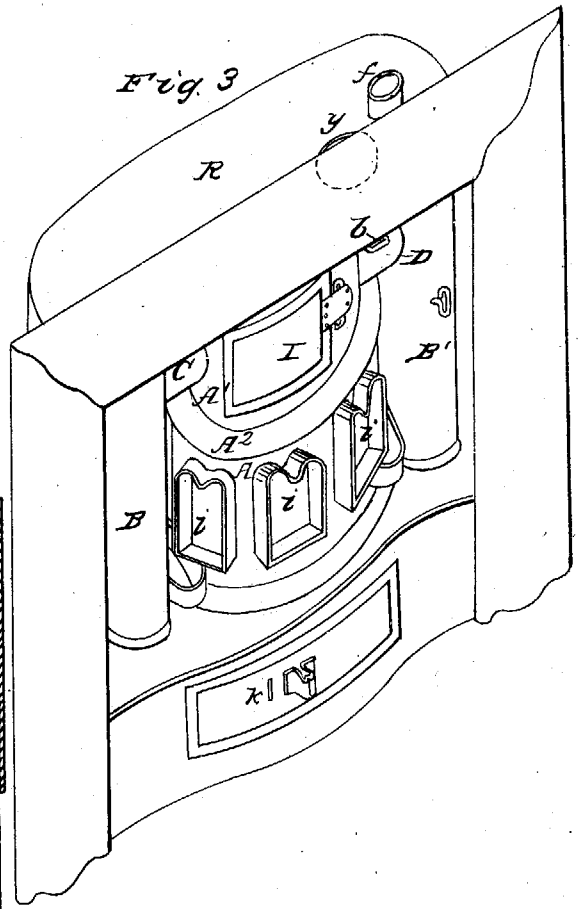
Figure 1:
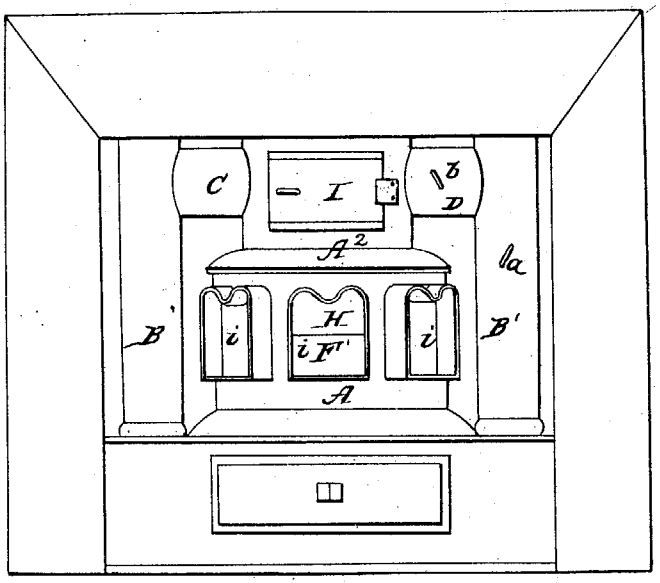
Figure 2:
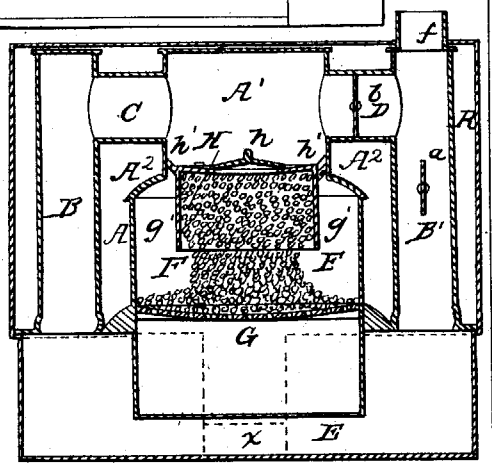

Figure 1 is a front elevation of a stove constructed according to my invention. Fig. 2 is a vertical longitudinal section of the same. Fig. 3 is a perspective view of the same.

Similar letters of reference in the several figures indicate corresponding parts.

To make a good and practical magazine base-burning stove for heating and illuminating purposes, it is essential to adopt the following features of construction:

First. To have a free enlarged space between the lower end of the magazine and the grated or perforated fire-bed, upon which the pile of coals rests, and this space should extend (all around) outwardly both below and around the lower free end of the magazine, and also be wholly unobstructed from said lower end, both out to the wall of the stove and down to the outer edge of that part of the stove which constitutes the grated fire-bed, or to the upper edge of the lining of the stove. By adopting this feature of construction and having the grated or perforated fire-bed of greater diameter than the lower end of the magazine, so that air is admitted through the grate from the center thereof to the wall or lining of the stove, (which feature, in combination with the enlarged grated bed, I believe to be my invention,) a sufficient amount of heat from this class of stoves is secured from a given amount of fuel, for the coal, which is constantly being supplied from the magazine, will freely spread out laterally (all around) from the lower end of the magazine in the form of a truncated cone, the base of which will extend to or nearly to the outer wall of the stove, or to the lining thereof. To thus have the coals spread out upon a large grated or perforated base (all round) and stand in a free space in a conical pile, instead of having them deposit into a grated fire-pot of cylindrical form, or into a deep perpendicular-sided pit, or into a concave basin with small area of grated or perforated surface, is of vital importance, for the coals thus spread out on a perforated surface outside of the range of the magazine burn freely in thin layers from the largest diameter of the cone pile to the smallest diameter thereof, and at all intermediate points, at one and the same time. In a word, the coal is burned on the surface of the entire cone pile in thin layers and in a free space all at the same time, the free space being between the conical pile and the wall of the stove, and air being admitted directly under the coal which is burned in this space, as well as under that coal which is directly under the magazine. The effect of thus burning the coal is obvious; but it may be important to state that the flame strikes directly upon the walls of the stove above the lining or grate, and the intensest heat is radiated from said walls into the room.

Second. The walls of the stove should have illumination-windows in them, and these illuminators should always be between the base of the conical pile of coals (above the lining of the stove) and top of the fuel-magazine, so that some part of the windows shall be directly opposite the free space in which the gases of the coal burn with a bright flame; further, they should be so located that the burning or partially-ignited coals shall not be allowed to pile up against them, although there is no shield or skirting in front of them. To have it certainly understood as to where I desire these windows located, I will state that their lower end should at least be as high, if not higher, than the point where the spreading of the coals is arrested. By thus locating the windows opposite the free space, or between the base and top of the conical pile of coals, and having the magazine arranged over a free space which is between it and the enlarged grated or perforated fire-bed, (the combination I believe is my invention,) the light from a bright free flame of gas is unobstructedly transmitted through the windows into the room and the most cheerful effect is produced, while every desired comfort from heat of the stove is secured, and at the same time I avoid the necessity of using an interior skirting, which is in relief from the interior of the wall of the stove, and acts to prevent direct radiation of heat—the very thing which should not be prevented in this kind of stove, especially when rooms above are heated from the one fire. I would state in this connection that to prevent rapid destruction and discoloration of the mica and other translucent media of which the windows are usually made from direct contact of flame, these windows are best if set out in relief from the interior of the cylinder-frame or body of the stove; and for convenience of cleaning and removing the mica, as well as kindling the fire through the window-frames, these windows or doors should be made removable or capable of being opened. I believe the mode of providing for kindling under the magazine practically through the window-frames, and also the setting of the windows in relief, are inventions of my own in connection with a stove operating as mine does.

Third. A gas or partially-spent gas space around the upper portion of the magazine should be formed, so that the gases will circulate in contact with the circumference of the magazine, (all round,) this space communicating with the free space which is between the magazine and the grated fire-bed, and between the lower part of the magazine and the illuminating-wall of the stove, this space allowing the gases to circulate in contact with the circumference of the magazine all round in their passage to the draft-flue, thus heating the upper part of the magazine and stove, and keeping the coals in the magazine at such a temperature as will insure a ready and perfect emission of their expanded gases down through the incandescent pile of coals. This feature of construction, in connection with the illumination-chamber and the enlarged free coal-spreading space, with grated or perforated bed under or below the magazine, I regard as my own invention.

Fourth. To increase the beneficial effect of a stove which embraces the foregoing features of construction, and also to prevent ignition of the coal in the upper part of the magazine, it is advisable in many cases, but not absolutely necessary, to have the products of combustion circulate over the cover of the magazine and in immediate contact with it, for as these products contain but little atmospheric air they act as a packing to prevent such air finding an ingress into the top of the magazine.

My invention is applicable to stoves with a single cylinder or to stoves with side columns which serve as diving-flues, such stoves in either case standing out in the room. It is also applicable, as represented, to fire-place stoves; but as I have patented the fire-place stove under a separate patent, I not do here claim that application of the invention.

To enable others skilled in the art to make and use my invention, I will proceed to describe the same.

A is the main or lower part of the stove, constituting by its own wall the combustion-chamber. The interior lower portion of this chamber may be, as usual, lined with fire-brick or other durable material below the point where the illumination-windows are located. I generally use bricks beveled off on their inner upper corners in such manner as to form a flaring or inclined fire-ledge around the upper edge of the grate. This lining should not occupy much of the space which is outside of the range of the lower end of the magazine, as a large free space, with air circulating (directly up through the outer portion of the grated bed) into it, shall be left for the coal to spread in. The grate G, upon which the conical pile of burning coals rests, may be slightly concave on its upper surface; or it may be horizontal so as to receive the falling coals properly. It is not material whether the old horizontal or convex grate be adopted in place of the concave grate. It is essential, however, that the bed upon which the base of the conical pile of coals rests be so constructed that the coals may spread out toward the wall of the stove beyond the lower end of the magazine H, and that the lateral extension of the fire-bed shall be grated or perforated, so that air shall be supplied to the coals near the wall of the stove as well as to the coals which lie near the middle of the grate. In a word, it is essential to supply sufficient air up through the grated fire bed to keep up a lively combustion of the coal on all parts of the grate. To this end I have made the grate G equal in diameter to the lower end of the wall of the combustion-chamber, less the thickness of the fire-brick, and of considerable greater diameter in its grated or perforated surface than the lower end of the magazine. To heat all parts of this lower or main chamber of the stove, the grated surface of the fire-bed should extend out all around beyond the lower end of the magazine.

Under the grated fire-bed the usual ash-pan is placed in the base E, which base may be constructed either hollow or solid around or beneath the ash-pan in any of the known ways.

Through the wall A, illumination-apertures *i* are formed. These apertures are located above the point where the broadest or base portion of the conical pile of coals rests, and in such relation to the lower end of the magazine H that the falling and spreading conical pile of coals cannot come up against them. Around the outer edge of each of the apertures a projecting window or door frame is formed, into the front part of which mica or other transparent material adapted to transmit light is placed. Through these framed apertures, by removing or opening the windows or doors, the fire may be kindled on the grate under the magazine. By inspecting the drawings the relative location of the windows or doors and the magazine and grate will be seen.

A′ is the upper portion of the stove. This may only communicate (directly) with a chimney-flue, *f*, by a branch, D, located at its back, or at any other point desired; or it may have one or more side columns, B B′, leading into a hollow base, and connecting thus indirectly with the chimney-flue *f*, the respective columns or flues to be controlled by dampers *a* or *b*, or by both *a* and *b*. The arrangement of flues and dampers, however, is no part of my claim under this patent, except so far as they form necessary connections with my invention to enable me to make it useful and practical in a stove for warming purposes. The upper portion, A′, of the stove is furnished with a door, I, so that coal may be introduced into the apartment A. The location of this door may be such as to suit circumstances or the style of the stove.

H is the magazine or coal-reservoir, from which the fire is continuously fed. This magazine is closed at top except at its center, where a hole, *j*, is cut. This is the supply-hole through which fresh coals are fed into the magazine. It is furnished with an adjustable or removable cover, *h*. The diameter of the magazine is less than the diameter of any part of the interior of the stove, and it is arranged vertically within the stove, so that its lower end generally reaches down about midway of the depth of the portion A. The upper end of the magazine may extend more or less up into the part A′ of the stove. There is a space or chamber between the inner side of the stove and the outer side of the magazine and at the point where the gases of the coals escape from the part A into part A′ of the stove. The last-mentioned space, *p p*, is more or less contracted with respect to the first-mentioned space, *p′*; and it is more advantageous to have the contraction made by means of a flat horizontal or nearly horizontal plate than what it is to have the plate of crown form, as shown by letter $A^2$ in the drawings; but inasmuch as the reverberation of the gases at this point is the object desired to be accomplished by such contraction, and such result may be produced in various ways analogous to that shown, I do not limit myself to this exact construction.

In locating the supports of the magazine it is desirable to place them as far out of contact with the incandescent mass of coals as practicable, in order to save them from rapid destruction from the red heat. In the drawings they are shown as being at the upper end of the fuel-magazine, at the points where the letters *p p*, which designate the contracted gas-space, are placed; but so far as the principle of operation of my invention is concerned, the effect would be nearly the same if the magazine were sustained at any other point on the wall of the stove above the grated fire-bed. When the magazine is most properly applied within the stove, there will be a space between the supports, all around the magazine, and between the wall of the stove and that portion of the magazine which is below the plate $A^2$. There will also be an unobstructed free space, F, below the magazine, extending down to the grated fire-bed and out to the wall of the stove or the lining thereof. There will likewise in many cases be a space for the circulation of the products of combustion above the magazine and in contact with the cover thereof. This latter space, however, is rather a furtherance of the beneficial effects of my main invention or improvements than an absolute prerequisite. All of the said spaces communicate with one another and terminate in the draft-flue *f*. Thus the gases or products of combustion circulate in contact with the interior of the upper part of the stove, and also around and below the magazine.

One of the leading features of my invention is a stove with a fuel-magazine of smaller diameter than the grated fire-bed, and a fire-chamber formed directly by the wall of the stove itself, said magazine being so applied that there is an upward draft-space outside of it (all around) above its lower end, and also a gas-burning space outside of and between its lower end and the upper outer edge of the grated surface, or of the lining of the stove-wall, this arrangement being such that the highly-inflamed gases are thrown off in an undivided body from the entire surface of a conical pile of burning coals, which occupies a larger area of grated and air-supplying surface than the superincumbent supply in the magazine directly against the radiating surface of the stove at points below the end of the magazine and above the upper outer edge of the grated bed or lining of the stove. Such inflamed gases being emitted in a free space and rising opposite illumination windows or doors which are opposite said free unobstructed space, and passing into the space between the upper part of the stove and the upper part of the magazine escape into the draft-flue. By this feature of invention the most perfect combustion, radiation, and illumination are secured.

The most advantageous manner of using the stove represented is as follows: To kindle the fire, the damper *b*, the door I, and the draft-door slide K of the ash pan or pit are opened, and the cover *h* removed. A plentiful supply of kindling is now placed on the grate G, under the magazine, through the apertures of the illumination-window frames. The kindling being ignited, a moderate supply of coal is introduced into the magazine and the door I closed. The draft being directly up through the magazine, the coal is in a short time thoroughly ignited. The fuel-magazine is now to be completely filled with hard coal, the cover *h* replaced over the opening *j*, and the door I shut. When this mass of coal is sufficiently heated througout, the damper *b* is partly or wholly closed—that is, if there are no diving-flues to the stove; but if diving-flues are constructed with the stove, the damper *b* may always be kept entirely closed after the fire is fully started, and a damper, *a*, be used as the regulator in connection with the draft door or slide *k*. I have found that the stove when in full burning or blast will burn slowly with both dampers and the draft-door closed; and it is advisable to thus adjust the regulators on going to bed, as the fuel will then consume but slowly during the night. The coal in the part A of the stove being perfectly incandescent outside of the circumferential range of the magazine when the fire is at full blast, the greatest possible amount of heat and light is evolved and emitted, and as the front of the stove or the whole body of the part A of the stove is provided with windows or transparent doors directly opposite a free space and the incandescent mass of fuel, and as all the descending gases from the magazine or reserve-supply coal are burned with a bright flame as they pass over the red coals, a brilliant and cheerful appearance is presented to view.

I will here remark that I mean by the term "thin layers" that the coal on the surface of the conical pile presents a step-like appearance or arrangement, and therefore each step on the surface may be designated as a layer, which layers, respectively, as they rise on the cone decrease in diameter, leaving room for surface burning on each layer.

What I claim as my invention, and desire to secure by Letters Patent, is—

1. A stove for warming or heating purposes, constructed with a fuel-magazine supported free from the grate, and a combustion-chamber having a grated fire and air-supplying bed of a greater diameter than the fuel-magazine, so arranged and constructed that the fuel can spread out laterally and form a conical pile and burn in thin layers out to the wall of the stove, so that the inflamed gases may burn in a free space, as they are evolved, from the entire outer surface of the incandescent conical pile of coals, and so that air shall be supplied in a direct manner through the grate into said free space, substantially as and for the purposes described.

2. In combination with the subject-matter of the first claim, constructing the combustion-chamber A with projecting window-frames or door-frames, substantially as and for the purposes described.

3. A stove for warming or heating purposes, embracing the features of construction mentioned in my first claim, and the additional feature of the gas or products of combustion circulating apartment above and around the upper portion of the magazine, substantially as and for the purposes described.

4. A stove for warming and heating purposes wherein the spreading of the coals in a lateral direction from the lower end of the magazine is wholly unobstructed all around and out to the wall of the stove A, and at the same time the combustion-chamber proper is formed by the outer wall of the stove and the products of combustion circulate underneath and around the magazine, in combination with illumination doors or windows in the said outer wall, said windows or doors being located above the grate and above the upper margin of the lining of the wall, substantially as and for the purposes described.

5. The combination of a fuel-supply magazine, H, which has its lower end free from the grated fire-bed G, and an unobstructed space below it, where the fuel may spread out laterally and burn in a conical pile and in thin layers to the outer wall of the stove, with a stove, A, which has illumination doors or windows in its wall above the lining, all in such manner that the fire can be kindled through the apertures which are covered by the doors or windows, substantially as set forth.

6. The combination of the unobstructed free space F out to the wall of the stove above the lining, the illumination windows or doors in wall A, and gas-circulating space *p* around the circumference of the magazine, substantially as described.

7. In a coal-supply magazine-stove, the extended grated surface of the fire-bed outside of reservoir or magazine, in combination with the free space around the magazine of a base-burning stove, substantially as described.

8. Increasing the combustion and the consequent heating effect of the coal, and also insuring a more brilliant illumination of the wall of the stove, by constructing, arranging, and combining the combustion-chamber proper, the magazine, and the grated fire-bed, all substantially in the manner herein specified.

S. B. SEXTON.

Witnesses:

SAML. MCCOY,

L. A. HOWSER, Jr.